United States Patent
Huang-Fu et al.

(10) Patent No.: US 11,265,771 B2
(45) Date of Patent: Mar. 1, 2022

(54) AT COMMANDS FOR SUPPORTING SESSION AND SERVICE CONTINUITY MODES OF 5G PROTOCOL DATA UNITSESSION OPERATIONS

(71) Applicant: MEDIATEK INC., Hsin-Chu (TW)

(72) Inventors: Chien-Chun Huang-Fu, Hsin-Chu (TW); Tsung-Huan Cheng, Hsin-Chu (TW); Yu-Hsin Lin, Hsin-Chu (TW); Chi-Hsien Chen, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 43 days.

(21) Appl. No.: 16/926,879

(22) Filed: Jul. 13, 2020

(65) Prior Publication Data

US 2021/0051533 A1  Feb. 18, 2021

Related U.S. Application Data

(60) Provisional application No. 62/886,417, filed on Aug. 14, 2019.

(51) Int. Cl.
*H04W 36/00* (2009.01)
*H04W 88/02* (2009.01)
*H04W 84/04* (2009.01)

(52) U.S. Cl.
CPC ...... *H04W 36/0033* (2013.01); *H04W 84/042* (2013.01); *H04W 88/02* (2013.01)

(58) Field of Classification Search
CPC . H04W 76/12; H04W 36/0022; H04W 36/14; H04W 36/0033; H04W 36/0011; H04W 84/042; H04W 88/02; H04W 36/08; H04W 80/10; H04W 76/11; H04W 36/0016
See application file for complete search history.

(56) References Cited

U.S. PATENT DOCUMENTS

| | | | |
|---|---|---|---|
| 2016/0218962 A1* | 7/2016 | Huang-Fu | H04L 69/166 |
| 2017/0086131 A1* | 3/2017 | Gupta | H04W 36/0061 |
| 2019/0253917 A1* | 8/2019 | Dao | H04L 12/1407 |
| 2019/0254118 A1* | 8/2019 | Dao | H04L 12/1407 |
| 2019/0313276 A1* | 10/2019 | Huang-Fu | H04W 28/0273 |
| 2020/0145876 A1* | 5/2020 | Dao | H04W 80/10 |
| 2021/0029586 A1* | 1/2021 | Zhu | H04W 28/12 |

* cited by examiner

*Primary Examiner* — Allahyar Kasraian
(74) *Attorney, Agent, or Firm* — Imperium Patent Works; Zheng Jin (57) ABSTRACT

A method of defining ATtention (AT) commands for supporting Service and Session Continuity (SSC) mode 2 and SSC mode 3 of 5G Protocol Data Unit (PDU) session operations is proposed. The AT command can be a notification of an unsolicited result code +CGEV: NW PDN DEACT, +CGEV: NW MODIFY, or +CGEV: ME PDN ACT, or a configuration command +CGDCONT with additional 5G parameters. Additional 5G parameters include an SSC, an old CID, a change reason and a PDU lifetime for the purpose of communicating information regarding the request of PDU session anchor relocation.

20 Claims, 6 Drawing Sheets

| COMMAND | POSSIBLE RESPONSE(S) |
|---|---|
| +CGDCONT=[<cid>[,<PDP_type>[,<APN>[,<PDP_addr>[,<d_comp>[,<h_comp>[,<IPv4AddrAlloc>[,<request_type>[,<P-CSCF_discovery>[,<IM_CN_Signalling_Flag_Ind>[,<NSLPI>[,<securePCO>[,<IPv4_MTU_discovery>[,<Local_Addr_Ind>[,<Non-IP_MTU_discovery>[,<Reliable_Data_Service>[,<SSC_mode>[,<S-NSSAI>[,<Pref_access_type>[,<RQoS_ind>[,<MH6-PDU>[,<Always-on_req>[,<old-cid>]]]]]]]]]]]]]]]]]]]]]]<br>(SET) | |
| +CGDCONT?<br>(READ) | [+CGDCONT: <cid>,<PDP_type>,<APN>,<PDP_addr>,<d_comp>,<h_comp>[,<IPv4AddrAlloc>[,<request_type>[,<P-CSCF_discovery>[,<IM_CN_Signalling_Flag_Ind>[,<NSLPI>[,<securePCO>[,<IPv4_MTU_discovery>[,<Local_Addr_Ind>[,<Non-IP_MTU_discovery>[,<Reliable_Data_Service>[,<SSC_mode>[,<S-NSSAI>[,<Pref_access_type>[,<RQoS_ind>[,<MH6-PDU>[,<Always-on_req>[,<old-cid>]]]]]]]]]]]]]]]]<br>[<CR><LF>+CGDCONT: <cid>,<PDP_type>,<APN>,<PDP_addr>,<d_comp>,<h_comp>[,<IPv4AddrAlloc>[,<request_type>[,<P-CSCF_discovery>[,<IM_CN_Signalling_Flag_Ind>[,<NSLPI>[,<securePCO>[,<IPv4_MTU_discovery>[,<Local_Addr_Ind>[,<Non-IP_MTU_discovery>[,<Reliable_Data_Service>[,<SSC_mode>[,<S-NSSAI>[,<Pref_access_type>[,<RQoS_ind>[,<MH6-PDU>[,<Always-on_req>[,<old-cid>]]]]]]]]]]]]]]]]<br>[...]] |

FIG. 5A

| COMMAND | POSSIBLE RESPONSE(S) |
|---|---|
| +CGDCONT=?<br>(TEST) | +CGDCONT: (range of supported <cid>s),<PDP_type>,,,(list of supported <d_comp>s),(list of supported <h_comp>s),(list of supported <IPv4AddrAlloc>s),(list of supported <request_type>s),(list of supported <P-CSCF_discovery>s),(list of supported <IM_CN_Signalling_Flag_Ind>s),(list of supported <NSLPI>s),(list of supported <securePCO>s),(list of supported <IPv4_MTU_discovery>s),(list of supported <Local_Addr_Ind>s),(list of supported <Non-IP_MTU_discovery>s),(list of supported <Reliable_Data_Service>s),(list of supported <SSC_mode>s),,(list of supported <Pref_access_type>s),(list of supported <RQoS_ind>s),(list of supported <MH6-PDU>s),(list of supported <Always-on_req>s)<br>[<CR><LF>+CGDCONT: (range of supported <cid>s),<PDP_type>,,,(list of supported <d_comp>s),(list of supported <h_comp>s),(list of supported <IPv4AddrAlloc>s),(list of supported <request_type>s),(list of supported <P-CSCF_discovery>s),(list of supported <IM_CN_Signalling_Flag_Ind>s),(list of supported <NSLPI>s),(list of supported <securePCO>s),(list of supported <IPv4_MTU_discovery>s),(list of supported <Local_Addr_Ind>s),(list of supported <Non-IP_MTU_discovery>s),(list of supported <Reliable_Data_Service>s),(list of supported <SSC_mode>s),,(list of supported <Pref_access_type>s),(list of supported <RQoS_ind>s),(list of supported <MH6-PDU>s),(list of supported <Always-on_req>s),(range of supported <old-cid>s)<br>[...]] |

AT COMMANDS FOR SUPPORTING SESSION AND SERVICE CONTINUITY MODES OF 5G PROTOCOL DATA UNITSESSION OPERATIONS

CROSS REFERENCE TO RELATED APPLICATIONS

This application claims priority under 35 U.S.C. § 119 from U.S. Provisional Application No. 62/886,417, entitled "AT command for SSC mode 2 and SSC mode 3," filed on Aug. 14, 2019, the subject matter of which is incorporated herein by reference.

TECHNICAL FIELD

The disclosed embodiments relate generally to wireless communication in 5G networks, and, more particularly, to AT commands for supporting Session and Service Continuity (SSC) mode 2 and SSC mode 3 of 5G Protocol Data Unit (PDU) session operations.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

In 5G, a Protocol Data Unit (PDU) session establishment procedure is a parallel procedure of a Packet Data Network (PDN) connection procedure in 4G. A PDU session defines the association between the UE and the data network that provides a PDU connectivity service. Each PDU session is identified by a PDU session ID, and may include multiple quality of service (QoS) flows and QoS rules. In 5G network, QoS flow is the finest granularity for QoS management to enable more flexible QoS control. The concept of QoS flow in 5G is like EPS bearer in 4G. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow.

The 5G Session Management (5GSM) functionality can be provided towards the applications and the terminal devices using an Application Programming Interface (API). Traditionally, for external applications, the EPS/IP bearer in LTE/4G networks and corresponding PDN connection management and resource allocation functionality may be provided through an AT command API in accordance with 3GPP Technical Specification (TS) 27.007 "AT command set for User Equipment (UE)". AT commands are used for controlling Mobile Termination (MT) functions and GSM/UMTS network services from a Terminal Equipment (TE) through Terminal Adaptor (TA). However, due to the specifications and/or requirements for 5G still being under development, many new features are introduced but they are not yet supported by the current 3GPP TS 27.007. Such new 5G features include the Session and Service Continuity (SSC) mode 2 and SSC mode 3 of 5G Protocol Data Unit (PDU) session operations.

A solution is sought for defining AT commands to support the SSC mode 2 and SSC mode 3 of 5G PDU session operations.

SUMMARY

In 5G, there are three types of Session and Service Continuity (SSC) modes and different SSC modes can guarantee different levels of service continuity. For a Protocol Data Unit (PDU) session with SSC mode 1, the same network anchor is kept regardless of the UE's location. For a PDU session with SSC mode 2, the network may trigger the release of the PDU session and instruct the UE to establish a new PDU session with a new network anchor, e.g., when the UE has moved away from the service area of its original network anchor. The "break-before-make" behavior in SSC mode 2 may cause the UE to suffer loss of connectivity during the time that the change of network anchor takes place. For a PDU session with SSC mode 3, the network allows the establishment of a new PDU session with the new network anchor before releasing the PDU session with the original network anchor. The "make-before-break" behavior in SSC mode 3 may ensure that the UE suffer no loss of connectivity during the change of network anchor.

A method of defining ATtention (AT) commands for supporting the SSC mode 2 and SSC mode 3 of 5G PDU session operations is proposed. The modem in a wireless network may provide a first AT command to an Application Processor (AP), wherein the first AT command indicates a request of PDU session anchor relocation. The modem may receive a second AT command from the AP, wherein the second AT command comprises an old Context ID (CID) associated with a released or existing PDU session and a CID associated with a PDU session to be established for the PDU session anchor relocation. The modem may transmit a PDU session establishment request to the wireless network, wherein the PDU session establishment request comprises PDU session parameters for the PDU session associated with the old CID. The modem may receive a PDU session establishment accept from the wireless network in response to the PDU session establishment request. In one example, the first AT command is an unsolicited result code +CGEV: NW PDN DEACT which comprises an indicator of a Session and Service Continuity (SSC) mode 2 to indicate the request of PDU session anchor relocation. In another example, the first AT command is an unsolicited result code +CGEV: NW MODIFY which comprises a change reason to indicate the request of PDU session anchor relocation and an indicator of a PDU session address lifetime. In one example, the second AT command is a set command +CGDCONT for configuring the PDU session parameters, and the old CID comprises an integer type indicating a context identifier of a QoS flow of a default QoS rule of an SSC mode 2 or SSC mode 3 PDU session.

In one embodiment, the providing of the first AT command is performed in response to the modem receiving from the wireless network a session management (SM) message indicating a request of PDU session reactivation. In one example, the SM message is a PDU session release command or a PDU session modification command which comprises a 5GSM cause #39 indicating the request of PDU session reactivation.

In another embodiment, the modem may provide a third AT command by the modem to the AP in response to the PDU session establishment accept, wherein the third AT command indicates that context of the PDU session associated with the CID has been activated. In one example, the third AT command is an unsolicited result code +CGEV: ME PDN ACT which comprises the old CID and an indicator of a Session and Service Continuity (SSC) mode 2 or SSC mode 3 of the established PDU session for the PDU session anchor relocation.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 5A-5B illustrate one embodiment of an AT command +CGDCONT for establishing a PDU session having a list of Packet Data Protocol (PDP) context parameters in accordance with one novel aspect.

DETAILED DESCRIPTION

Reference will now be made in detail to some embodiments of the invention, examples of which are illustrated in the accompanying drawings.

Figure 1:
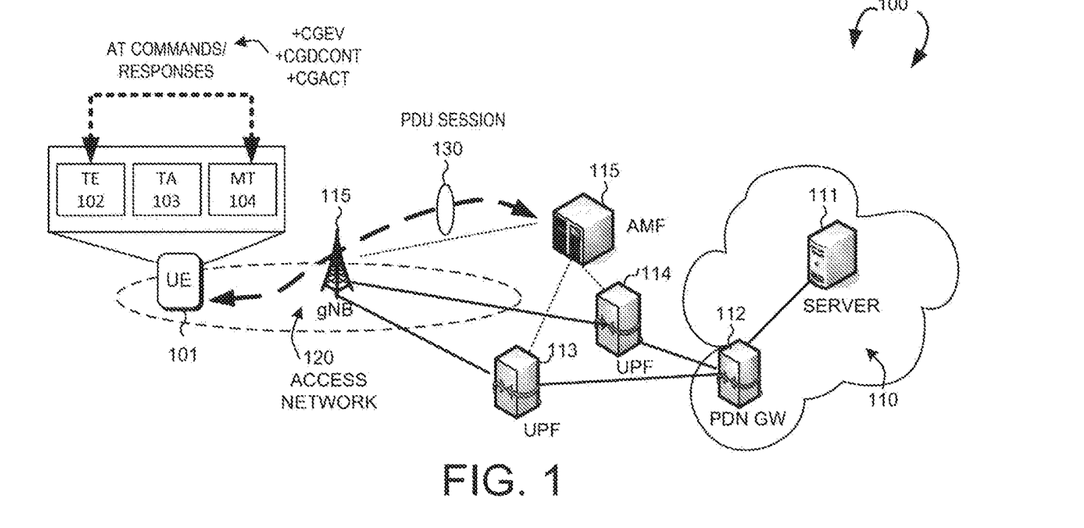
FIG. 1 illustrates a Protocol Data Unit (PDU) session and related PDU session procedures via Attention (AT) commands in a 5G New Radio (NR) network 100 in accordance with one novel aspect.

FIG. 1 illustrates a Protocol Data Unit (PDU) session and related PDU session procedures via Attention (AT) commands in a 5G New Radio (NR) network 100 in accordance with one novel aspect. 5G NR network 100 includes application server 111 that provides various services by communicating with a plurality of User Equipments (UEs) including UE 101. In the example of FIG. 1, application server 111 and a Packet Data Network Gateway (PDN GW) 112 belong to part of a 5G core network 5GC 110. UE 101 and its serving base station gNB 102 belong to part of a Radio Access Network (RAN) 120. RAN 120 provides radio access for UE 101 via a Radio Access Technology (RAT) (e.g., the 5G NR technology). Application server 111 communicates with UE 101 through PDN GW 112, one or more User Plane Functions (UPFs) 113 and 114, and gNB 102. An Access and Mobility Management Function (AMF) 115 communicates with gNB 102, UPF 113/114 and PDN GW 112 for access and mobility management of wireless access devices in 5G NR network 100. UE 101 may be equipped with a Radio Frequency (RF) transceiver or multiple RF transceivers for different application services via different RATs/CNs. For example, UE 101 may be a smart phone, a wearable device, an Internet of Things (IoT) device, and a tablet, etc. Alternatively, UE 101 may be a Notebook (NB) or Personal Computer (PC) inserted or installed with a data card which includes a modem and RF transceiver(s) to provide the functionality of wireless communication.

5G networks are Packet-Switched (PS) Internet Protocol (IP) networks. This means that the networks deliver all data traffic in IP packets, and provide users with Always-On IP Connectivity. When UE joins an 5G network, a Packet Data Network (PDN) address (i.e., the one that can be used on the PDN) is assigned to the UE for its connection to the PDN. In 5G, a PDU session establishment is a parallel procedure of PDN connection procedure in 4G. A PDU session, e.g., 130, defines the association between the UE and the data network that provides a PDU connectivity service. Each PDU session is identified by a PDU session ID, and may include multiple QoS flows and QoS rules. Each PDU session is configured with one default QoS rule (DQR).

The PDU session/QoS flow in 5G, and corresponding session management functionality can be provided towards the applications and the terminal devices using an Application Programming interface (API) based on Packet Data Protocol (PDP) contexts. A PDP context can be regarded as a data record of parameters that characterize a specific bearer and connection to the target PDN. Multiple applications running on one UE may require multiple connections/sessions to one or more PDNs, so that multiple PDP contexts may have to be defined. These multiple PDP contexts can be grouped into primary PDP contexts (also referred to as non-secondary PDP contexts) and secondary PDP contexts. Multiple primary PDP contexts provide connections/sessions to different PDNs are each associated with a unique IP address.

For external applications, the session management functionality may be provided through an AT command API in accordance with 3GPP TS 27.007 "AT command set for User Equipment (UE)". AT commands are used for controlling Mobile Termination (MT) functions and GSM/UMTS network services from a Terminal Equipment (TE) through Terminal Adaptor (TA). In the example of FIG. 1, UE 101 includes a TE 102, a TA 103, and an MT 104. TE 102 can use AT commands to control MT 104 to perform session management functionality. For example, TE 102 can use AT commands for querying PDP context information and for setting PDP context parameters. 3GPP TS 27.007 defines a plurality of AT commands for controlling MT functions and GPRS packet domain services based on PDP contexts. Each AT command includes a Context Identification (CID) parameter as reference to the specific PDP context to which the AT command applies. The TA 103, MT 104 and TE 102 may be implemented in the form of separate or integrated entities as needed. The span of control of the defined AT commands allows handling of any physical implementation that may lead to: TA, MT and TE as three separate entities; TA integrated under the MT cover, and TE implemented as a separate entity; TA integrated under the TE cover, and MT implemented as a separate entity; and TA and MT integrated under the TE cover as a single entity. For example, TA 103 and MT 104 may be implemented in a 5G data card product, while TE 102 may be implemented in a NB, PC, or any computing device.

In accordance with one novel aspect, AT commands for request of PDU session anchor relocation, configuration of PDU session parameters for a PDU session to be established for the PDU session anchor relocation, and indication of context activation of the PDU session being completed, are defined for 5G networks. In one embodiment, TE 102 sends an AT command to TA 103, which converts to an MT control to be sent to MT 104. The AT commands can be a notification of an unsolicited result code, or a configuration command. In response, MT 104 sends an MT status back to TA 103, which converts to a response to be sent to TE 102. Specifically, the AT command can be a notification of an unsolicited result code for indicating the request of PDU session anchor relocation. For example, additional 5G parameter including an SSC is defined for AT command +CGEV: NW PDN DEACT. The SSC is an integer type indicating whether the established PDU session is requested by the network for SSC mode 2 or SSC mode 3 PDU session anchor relocation.

For example, additional 5G parameters including a change reason and a PDU lifetime are defined for AT command +CGEV: NW MODIFY. The change reason is an integer type indicating a specific kind of change occurred, which is a relocation of PDU session anchor requested. The PDU lifetime is an integer type indicating the PDU session address lifetime value in seconds for relocation of SSC mode 3 PDU session anchor.

For example, additional 5G parameter including an old Context ID (CID) is defined for AT command +CGDCONT. The old CID is an integer type indicating the context identifier of the QoS flow of the default QoS rule of the SSC mode 2 or SSC mode 3 PDU session where the network requests relocation of the PDU session anchor.

For example, additional 5G parameters including an SSC and an old CID are defined for AT command +CGEV: ME PDN ACT. The SSC is an integer type indicating whether the established PDU session is requested by the network for SSC mode 2 or SSC mode 3 PDU session anchor relocation. The old CID is an integer type indicating the context identifier of the QoS flow of the default QoS rule of the SSC mode 2 or SSC mode 3 PDU session where the network requests relocation of the PDU session anchor.

Figure 2:
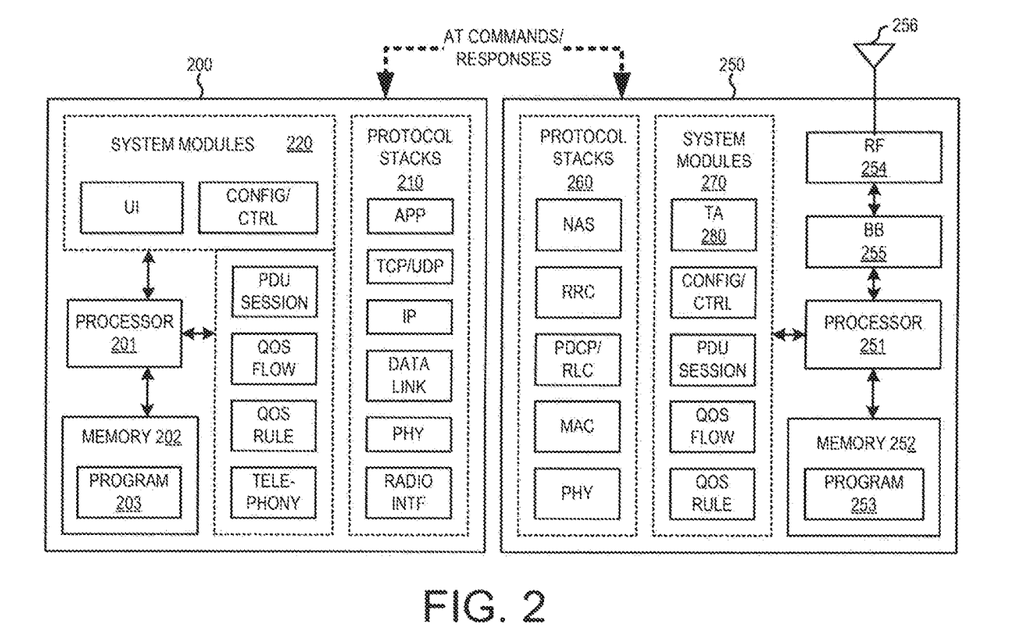
FIG. 2 illustrates a simplified block diagram of an architecture comprising a Terminal Equipment (TE) and a Mobile Termination (MT) in accordance with one novel aspect.

FIG. 2 illustrates a simplified block diagram of an architecture comprising a Terminal Equipment (TE) and a Mobile Termination (MT) in accordance with one novel aspect. TE 200 includes a processor 201, memory 202, and protocol stacks 210 including Application (APP) layer, Transport (TCP/UDP) layer, Network (IP) layer, Data Link layer, and Physical (PHY) layer. TE 200 further includes system control modules and circuits 220 including a user interface, a configuration and control module, a PDU session handler, a QoS flow handler, a QoS rule handler, and a telephony module. Processor 201 processes different applications and invokes different system control modules to perform various features of TE 200. Memory 202 stores program instructions and data 203 to control the operations of TE 200. The system control modules and circuits can be implemented and configured to carry out functional tasks of TE 200. Note that TE 200 may also be referred to as an Application Processor (AP). Typically, TE 200 is also equipped with telephony framework circuits (e.g., a dialer, a call manager etc.) to support voice call functionality. In addition, TE 200 also supports the AT commands as defined by 3GPP TS 27.007 for controlling MT functions and GPRS packet domain services based on PDP contexts for each PDU session identified by CID.

MT 250 has an antenna 256, which transmits and receives radio signals. A RF transceiver module 254, coupled with the antenna, receives RF signals from antenna 256, converts them to baseband signals and sends them to processor 251 via baseband module 255. RF transceiver 254 also converts received baseband signals from processor 251 via baseband module 255, converts them to RF signals, and sends out to antenna 256. Processor 251 processes the received baseband signals and invokes different functional modules to perform features in MT 250. Memory 252 stores program instructions and data 253 to control the operations of MT 250. MT 250 also comprises a set of protocol stacks 260 and control circuits including various system modules 270 to carry out functional tasks of MT 250. Protocol stacks 260 includes Non-Access-Stratum (NAS) layer, Radio Resource Control (RRC) layer, Packet Data Convergence Protocol/Radio Link Control (PDCP/RLC) layer, Media Access Control (MAC) layer, and Physical (PHY) layer. System modules 270 includes a configuration module, a control module, a PDU session handler, a QoS flow handler, and a QoS rule handler. Note that MT 250 may also be referred to as a modem. In the example of FIG. 2, MT 250 further includes a Terminal Adaptor (TA 280) that receives and transmits AT commands and converts the AT commands to be processed by processor 251 for controlling MT functions. In one example, TA 280 receives an AT set command from TE 200 for establishing a PDU session with the network. In another example, TA 280 receives an AT read command from TE 200 for MT 250 to provide PDU and QoS parameters to TE 200.

Figure 3:
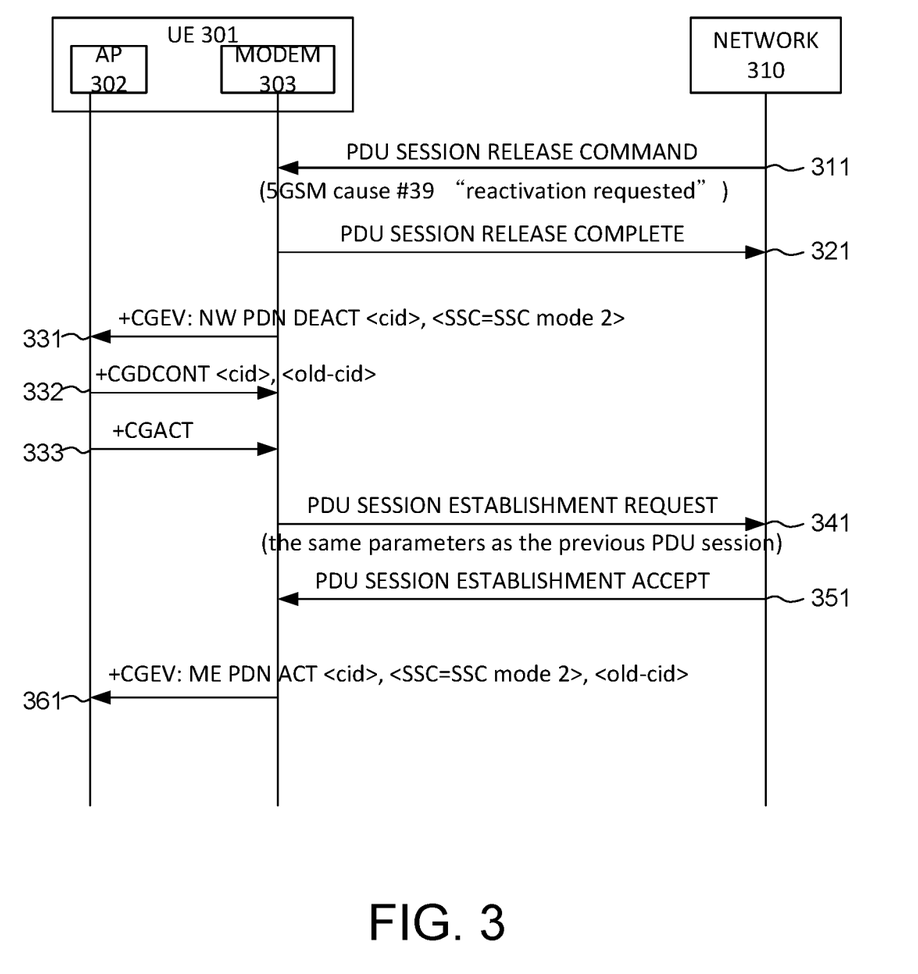
FIG. 3 illustrates an SSC mode 2 PDU session anchor relocation in accordance with one novel aspect. Network 310 provides PDU connectivity service to UE 301 via a PDU session.

FIG. 3 illustrates an SSC mode 2 PDU session anchor relocation in accordance with one novel aspect. Network 310 provides PDU connectivity service to UE 301 via a PDU session. UE 301 includes an AP 302 and a modem 303, communicating with each other via AT commands. In the example of FIG. 3, modem 303 uses AT commands for communication with AP 302 to complete the SSC mode 2 PDU session anchor relocation. In step 311, modem 303 receives a PDU session release command from network 310. Specifically, the PDU session release command includes a 5GSM cause #39 "reactivation requested" which indicates a request of PDU session reactivation. In step 321, modem 303 transmits a PDU session release complete to network 310 after releasing the PDU session indicated by the PDU session release command. In response to the PDU session release command, modem 303 sends an AT command +CGEV: NW PDN DEACT to AP 302 (step 331). Specifically, the AT command +CGEV: NW PDN DEACT includes 5G parameters, such as a CID associated with the released PDU session, and an SSC set to "SSC mode 2" to indicate the request of PDU session anchor relocation. In step 332, modem 303 receives an AT command +CGDCONT. Specifically, the AT command +CGDCONT includes 5G parameters, such as an old CID associated with the released PDU session, and a CID associated with the PDU session to be established for the PDU session anchor relocation. In step 333, AP 302 then sends an AT command +CGACT to modem 303 to trigger the PDU session establishment procedure. Upon receiving the AT command +CGACT, in step 341, modem 303 transmits a PDU session establishment request to network 310. Specifically, the PDU session establishment request includes the same PDU session parameters as the previous PDU session (i.e., the released PDU session). In step 351, modem 303 receives a PDU session establishment accept from network 310. In step 361, modem 303 sends an AT command +CGEV: ME PDN ACT to AP 302 and completes the SSC mode 2 PDU session anchor relocation. Specifically, the AT command +CGEV: ME PDN ACT includes 5G parameters, such as an old CID associated with the released PDU session, an SSC set to "SSC mode 2", and a CID associated with the newly established PDU session.

Figure 4:
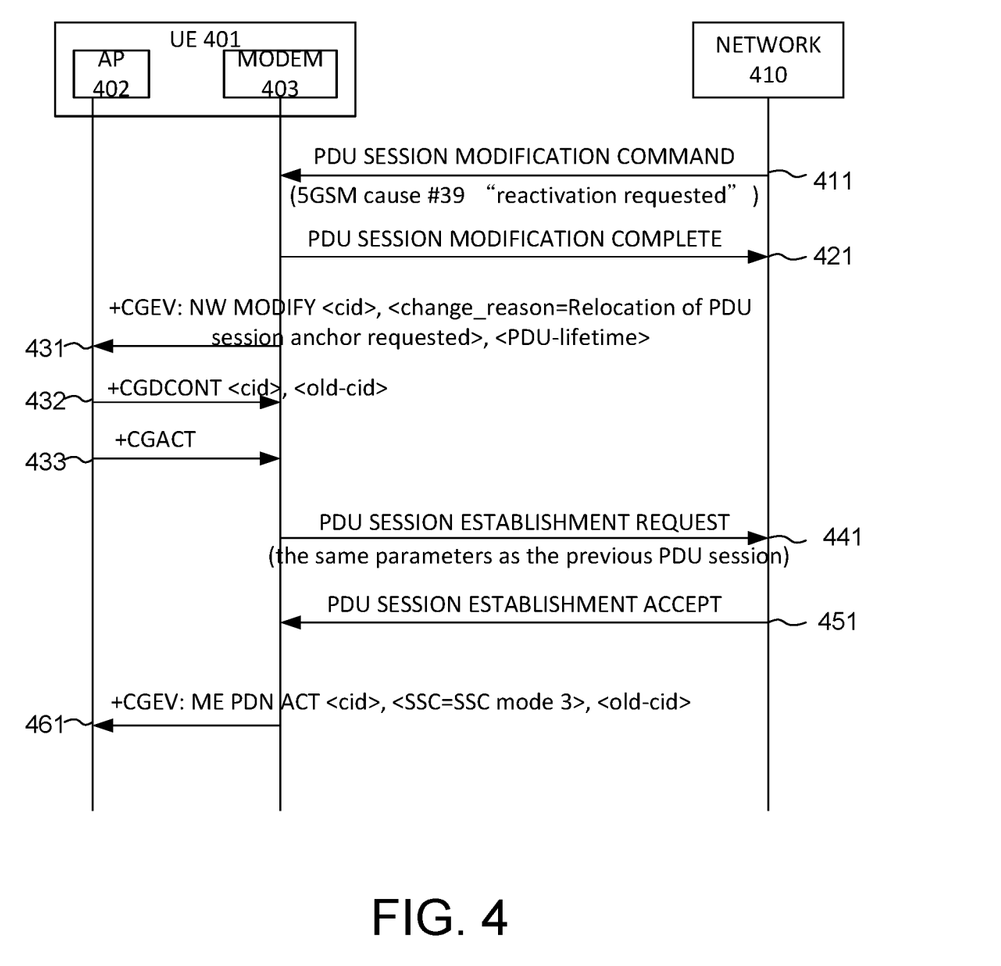
FIG. 4 illustrates an SSC mode 3 PDU session anchor relocation in accordance with one novel aspect. Network 410 provides PDU connectivity service to UE 401 via a PDU session.

FIG. 4 illustrates an SSC mode 3 PDU session anchor relocation in accordance with one novel aspect. Network 410 provides PDU connectivity service to UE 401 via a PDU session. UE 401 includes an AP 402 and a modem 403, communicating with each other via AT commands. In the example of FIG. 4, modem 403 uses AT commands for communication with AP 402 to complete the SSC mode 3 PDU session anchor relocation. In step 411, modem 403 receives a PDU session modification command from network 410. Specifically, the PDU session modification command includes a 5GSM cause #39 "reactivation requested" which indicates a request of PDU session reactivation. In step 421, modem 403 transmits a PDU session modification complete to network 410. In response to the PDU session modification command, modem 403 sends an AT command +CGEV: NW MODIFY to AP 402 (step 431). Specifically, the AT command +CGEV: NW MODIFY includes 5G parameters, such as a CID associated with the established/existing PDU session, a change reason set to "Relocation of PDU session anchor requested", and a PDU lifetime indicating a PDU session address lifetime. In step 432, modem 403 receives an AT command +CGDCONT. Specifically, the AT command +CGDCONT includes 5G parameters, such as an old CID associated with the established/existing PDU session, and a CID associated with the PDU session to be established for the PDU session anchor relocation. In step 433, AP 402 then sends an AT command +CGACT to modem 403 to trigger the PDU session establishment procedure. Upon receiving the AT command +CGACT, in step 441, modem 403 transmits a PDU session establishment request to network 410. Specifically, the PDU session establishment request includes the same PDU session parameters as the previous PDU session (i.e., the released PDU session). In step 451, modem 403 receives a PDU session establishment accept from network 410. In step 461, modem 403 sends an AT command +CGEV: ME PDN ACT to AP 402 and completes the SSC mode 3 PDU session anchor relocation. Specifically, the AT command +CGEV: ME PDN ACT includes 5G parameters, such as a CID associated with the newly established PDU session, an SSC set to "SSC mode 3", and an old CID associated with the established/existing PDU session.

Figure 5A:
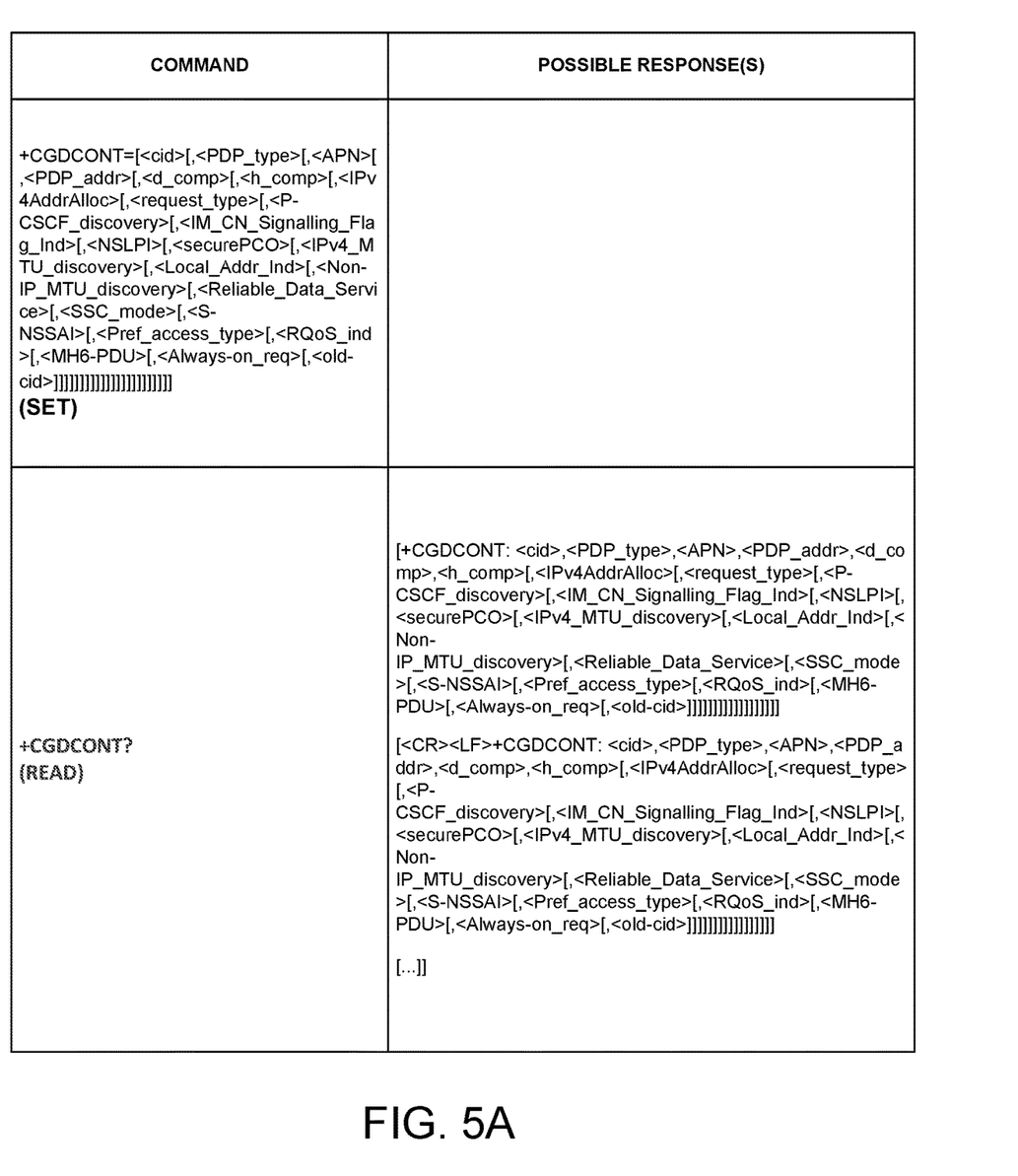

FIGS. 5A-5B illustrate one embodiment of an AT command +CGDCONT for establishing a PDU session having a list of Packet Data Protocol (PDP) context parameters in accordance with one novel aspect. As illustrated in FIGS. 5A-5B, the AT command +CGDCONT is a set or read or test command. The set command specifies PDP context parameters values for a PDP context identified by the local context identifier parameter <cid>, and also allows the TE to specify whether security protected transmission of ESM information is requested, because the PCO can include information that requires ciphering. There can be other reasons for the UE to use security protected transmission of ESM information, e.g., if the UE needs to transfer an APN. The number of PDP contexts that may be in a defined state at the same time is given by the range returned by the test command. The execution of the read command returns the current settings for each defined context. The execution of the test command returns values supported as compound values. If the MT supports several PDP types, <PDP_type>, the parameter value ranges for each <PDP_type> are returned on a separate line.

The defined values of the relevant information include: <cid>: specifies a particular PDP context definition; <PDP_type>: specifies the type of packet data protocol; <APN>: a logical name that is use to select the packet data network; <PDP_addr>: identifies the MT in the address space applicable to the PDP; <d_comp>: controls PDP data compression; <h_comp>: controls PDP header compression; <IPv4AddrAlloc>: controls how the MT/TA requests to get the IPv4 address information; <request_type>: indicates the type of PDP context activation request for the PDP context; <P-CSCF_discovery>: influences how the MT/TA requests to get the P-CSCF address; <IM_CN_Signaling_Flag_Ind>: indicates to the network whether the PDP context is for IM CN subsystem-related signaling only or not; <NSLPI>: indicates the NAS signaling priority requested for this PDP context; <securePCO>: specifies if security protected transmission of PCO is requested or not; <IPv4_MTU_discovery>: influences how the MT/TA requests to get the IPv4 MTU size; <local_Addr_Ind>: indicates local address; <Non-IP_MTU_discovery>: influences MTU discovery for non-IP packets; <Reliable_Data_service>: indicates reliable data service; <SSC_mode>: indicates the support of SSC mode for continuity requirements of different applications and services for UE; <S-NSSAI>: identifies a network slice with which the PDU session is associated; <Pref_access_type>: indicates the preferred access type for the PDU session in 5GS; <RQoS_Ind>: indicates whether UE can map uplink user plane traffic to QoS flows without SMF provided QoS rules; <MH6-PDU>: indicates the maximum number of packet filters that can be supported by UE for the PDU session; <Always-on_req>: indicates whether the UE requests to establish the PDU session as an always-on PDU session; and <old-cid>: indicates the context identifier of the QoS flow of the default QoS rule of the SSC mode 2 or SSC mode 3 PDU session where the network requests relocation of the PDU session anchor.

Figure 6:
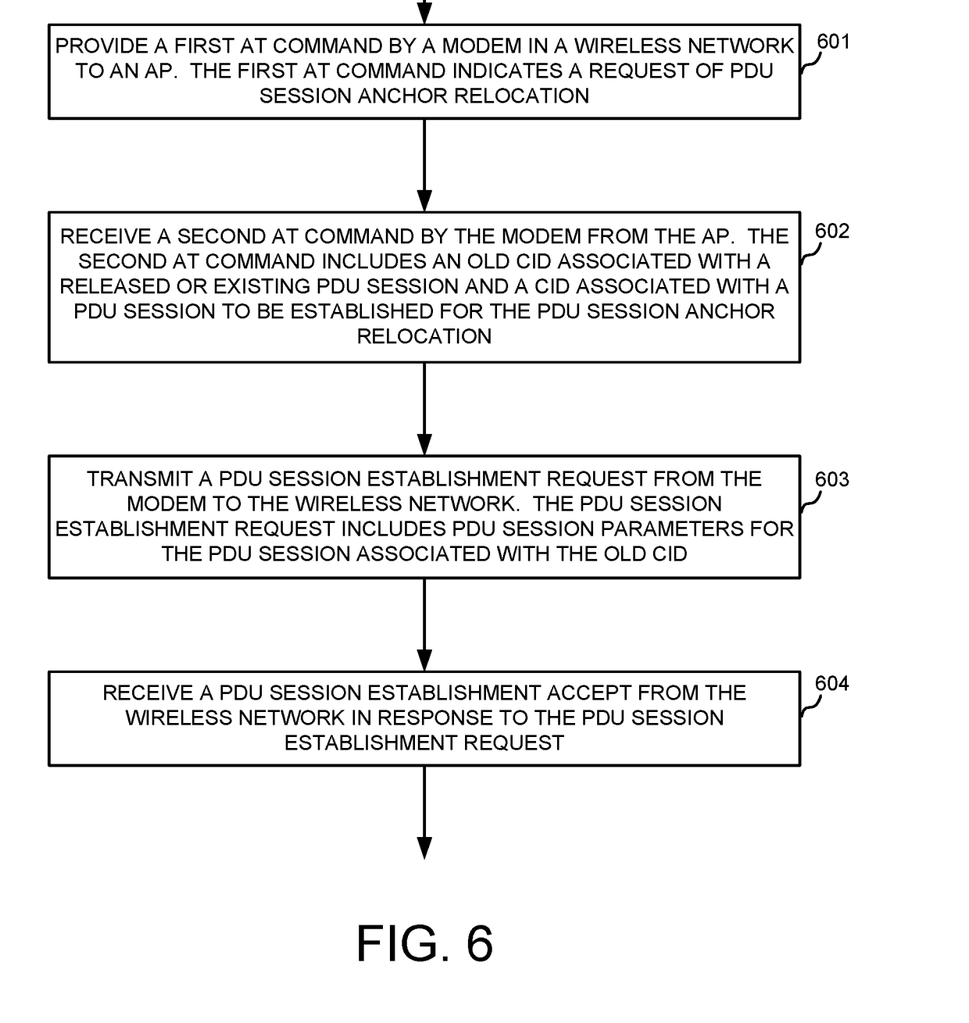
FIG. 6 illustrates a flow chart of a method for supporting SSC mode 2 and SSC mode 3 of 5G PDU session operations by a UE in accordance with one novel aspect.

FIG. 6 illustrates a flow chart of a method for supporting SSC mode 2 and SSC mode 3 of 5G PDU session operations by a UE in accordance with one novel aspect. In step 601, the modem in a wireless network provides a first AT command to an AP. The first AT command indicates a request of PDU session anchor relocation. In one embodiment, the first AT command is an unsolicited result code +CGEV: NW PDN DEACT which includes an indicator of an SSC mode 2 to indicate the request of PDU session anchor relocation. In another embodiment, the first AT command is an unsolicited result code +CGEV: NW MODIFY which includes a change reason to indicate the request of PDU session anchor relocation and an indicator of a PDU session address lifetime.

In step 602, the modem receives a second AT command from the AP. The second AT command includes an old CID associated with a released or existing PDU session and a CID associated with a PDU session to be established for the PDU session anchor relocation. In one embodiment, the second AT command is a set command +CGDCONT for configuring the PDU session parameters. The old CID comprises an integer type indicating a context identifier of a QoS flow of a default QoS rule of an SSC mode 2 or SSC mode 3 PDU session.

In step 603, the modem transmits a PDU session establishment request to the wireless network. The PDU session establishment request includes PDU session parameters for the PDU session associated with the old CID. In step 604, the modem receives a PDU session establishment accept from the wireless network in response to the PDU session establishment request. In one example, the modem may provide a third AT command to the AP in response to the PDU session establishment accept. The third AT command may be an unsolicited result code +CGEV: ME PDN ACT which includes the old CID and an indicator of an SSC mode 2 or SSC mode 3 of the established PDU session for the PDU session anchor relocation.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   providing a first Attention (AT) command by a modem in a wireless network to an Application Processor (AP), wherein the first AT command indicates a request of Protocal Data Unit (PDU) session anchor relocation;
   receiving a second AT command by the modem from the AP, wherein the second AT command comprises an old Context ID (CID) associated with a released or an existing PDU session and a CID associated with a PDU session to be established for the PDU session anchor relocation;
   transmitting a PDU session establishment request from the modem to the wireless network, wherein the PDU session establishment request comprises PDU session parameters for the PDU session associated with the old CID; and
   receiving a PDU session establishment accept from the wireless network in response to the PDU session establishment request.

2. The method of claim 1, wherein the providing of the first AT command is performed in response to the modem receiving from the wireless network a session management (SM) message indicating a request of PDU session reactivation.

3. The method of claim 2, wherein the SM message is a PDU session release command or a PDU session modification command which comprises a 5GSM cause #39 indicating the request of PDU session reactivation.

4. The method of claim 1, wherein the first AT command is an unsolicited result code +CGEV: NW PDN DEACT which comprises an indicator of a Session and Service Continuity (SSC) mode 2 to indicate the request of PDU session anchor relocation.

5. The method of claim 1, the first AT command is an unsolicited result code +CGEV: NW MODIFY which comprises a change reason to indicate the request of PDU session anchor relocation or comprises the change reason and an indicator of a PDU session address lifetime.

6. The method of claim 1, wherein the second AT command is a set command +CGDCONT for configuring the PDU session parameters.

7. The method of claim 1, further comprising:
   providing a third AT command by the modem to the AP in response to the PDU session establishment accept, wherein the third AT command indicates that context of the PDU session associated with the CID has been activated.

8. The method of claim 7, wherein the third AT command is an unsolicited result code +CGEV: ME PDN ACT which comprises the old CID and an indicator of a Session and Service Continuity (SSC) mode 2 or SSC mode 3 of the established PDU session for the PDU session anchor relocation.

9. The method of claim 1, wherein the old CID comprises an integer type indicating a context identifier of a quality of service (QoS) flow of a default QoS rule of a Session and Service Continuity (SSC) mode 2 or SSC mode 3 PDU session.

10. The method of claim 1, wherein the wireless network is a 5G system (5GS).

11. A Mobile Terminal (MT), comprising:
    a processor that provides a first Attention (AT) command to an Application Processor (AP) in a wireless network, and receives a second AT command from the AP, wherein the first AT command indicates a request of Protocal Data Unit (PDU) session anchor relocation, and the second AT command comprises an old Context ID (CID) associated with a released or existing PDU session and a CID associated with a PDU session to be established for the PDU session anchor relocation;
    a transmitter that transmits a PDU session establishment request to the wireless network, wherein the PDU session establishment request comprises PDU session parameters for the PDU session associated with the old CID; and
    a receiver that receives a PDU session establishment accept from the wireless network in response to the PDU session establishment request.

12. The MT of claim 11, wherein the providing of the first AT command is performed in response to the receiver receiving from the wireless network a session management (SM) message indicating a request of PDU session reactivation.

13. The MT of claim 12, wherein the SM message is a PDU session release command or a PDU session modification command which comprises a 5GSM cause #39 indicating a request of PDU session reactivation.

14. The MT of claim 11, wherein the first AT command is an unsolicited result code +CGEV: NW PDN DEACT which comprises an indicator of a Session and Service Continuity (SSC) mode 2 to indicate the request of PDU session anchor relocation.

15. The MT of claim 11, the first AT command is an unsolicited result code +CGEV: NW MODIFY which comprises an indicator of a PDU session address lifetime and a change reason to indicate the request of PDU session anchor relocation.

16. The MT of claim 11, wherein the second AT command is a set command +CGDCONT for configuring the PDU session parameters.

17. The MT of claim 11, wherein the processor further provides a third AT command to the AP in response to the PDU session establishment accept, wherein the third AT command indicates that context of the PDU session associated with the CID has been activated.

18. The MT of claim 17, wherein the third AT command is an unsolicited result code +CGEV: ME PDN ACT which comprises the old CID and an indicator of a Session and Service Continuity (SSC) mode 2 or SSC mode 3 of the established PDU session for the PDU session anchor relocation.

19. The MT of claim 11, wherein the old CID comprises an integer type indicating a context identifier of a quality of service (QoS) flow of a default QoS rule of a Session and Service Continuity (SSC) mode 2 or SSC mode 3 PDU session.

20. The MT of claim 11, wherein the wireless network is a 5G system (5GS).

\* \* \* \* \*